United States Patent
Park

(10) Patent No.: US 7,020,552 B2
(45) Date of Patent: Mar. 28, 2006

(54) ROLLOVER CONTROL METHOD AND SYSTEM THEREOF

(75) Inventor: Joon-Hong Park, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 169 days.

(21) Appl. No.: 10/712,346

(22) Filed: Nov. 12, 2003

(65) Prior Publication Data

US 2004/0128060 A1    Jul. 1, 2004

(30) Foreign Application Priority Data

Dec. 27, 2002    (KR) ............................. 2002-84976

(51) Int. Cl.
  *G06F 7/00*    (2006.01)
(52) U.S. Cl. .................... 701/45; 701/36; 701/41; 180/271; 280/5.506; 280/5.51
(58) Field of Classification Search ............ 701/41–43, 701/45, 36–39; 180/271, 282, 283; 280/5.5, 280/5.502, 5.506, 5.51; 340/429, 440
See application file for complete search history.

(56) References Cited

U.S. PATENT DOCUMENTS

| | | | |
|---|---|---|---|
| 5,747,683 A | 5/1998 | Gerum et al. | |
| 6,002,974 A | 12/1999 | Schiffmann | |
| 6,253,123 B1 | 6/2001 | Schramm et al. | |
| 6,292,759 B1 | 9/2001 | Schiffmann | |
| 6,324,447 B1 | 11/2001 | Schramm et al. | |
| 6,332,104 B1 | 12/2001 | Brown et al. | |
| 6,338,012 B1 | 1/2002 | Brown et al. | |
| 6,494,281 B1 * | 12/2002 | Faye et al. | 180/197 |
| 6,496,758 B1 | 12/2002 | Rhode et al. | |
| 2001/0008986 A1 | 7/2001 | Brown et al. | |
| 2002/0095244 A1 | 7/2002 | Rhode et al. | |

* cited by examiner

*Primary Examiner*—Yonel Beaulieu
(74) *Attorney, Agent, or Firm*—Morgan Lewis & Bockius LLP

(57) ABSTRACT

A rollover control method and a system thereof for accurately predicting the occurrence of a rollover and protecting passengers therefrom.

9 Claims, 4 Drawing Sheets

ROLLOVER CONTROL METHOD AND SYSTEM THEREOF

CROSS-REFERENCE TO RELATED APPLICATIONS

This application claims priority of Korean Application No. 10-2002-0084976, filed on Dec. 27, 2002, the disclosure of which is incorporated filly herein by reference.

FIELD OF THE INVENTION

The present invention relates to a rollover control method and a system thereof and, more particularly, to a rollover control method and a system thereof adapted to predict a rollover and to prevent a vehicle from turning over while the vehicle is in motion and to activate a safety system, thereby protecting the passengers from a rollover.

BACKGROUND OF THE INVENTION

There is a drawback in the conventional rollover control method and system in that a model used to predict the rollover is based on a steady state such that an accurate prediction cannot be made in relation to a transient rollover. Further, the conventional rollover control method and system has a wide margin of error, resulting in incorrect results in predicting a rollover for a moving vehicle.

SUMMARY OF THE INVENTION

Embodiments of the present invention provide a rollover control method and a system thereof adapted to accurately predict and determine the possibility of a transient rollover, whereby passengers can be protected by either preventing the rollover or actuating a safety system when the rollover occurs.

In accordance with one embodiment of the present invention, there is provided a rollover control method, the method comprising the steps of: detecting a steering angle, wheel Revolutions Per Minute (RPM), roll angle, roll rate, yaw rate and vehicle speed detected according to the change of the operation state of a vehicle; processing the steering angle and the wheel RPM thus detected by a vehicle dynamical equation, thereby calculating a longitudinal velocity, lateral velocity, yaw rate, roll rate, roll angle, slip angle, and slip ratio; predicting a slip angle transiently generated while the yaw rate, roll rate, roll angle, and vehicle speed thus detected and the valves calculated using the vehicle dynamical equation are processed by a filter; calculating a tire lateral force based on the slip angle thus predicted; performing a pre-rollover decision subroutine that estimates the possibility of generating a rollover based on the tire lateral force thus computed; predicting a lateral velocity using the filter when there is a possibility of a rollover at the pre-rollover decision subroutine; and performing a rollover decision subroutine that assesses the rollover based on the lateral velocity thus decided. In a preferred embodiment the filter is a Kalman filter.

The pre-rollover decision subroutine comprises the steps of: determining whether a vehicle is turning based on the tire lateral force; determining whether a vehicle is sharply turning after a first warning when it is determined that the vehicle is turning; and performing a control action in order to prevent a rollover following a second warning when the vehicle makes a sharp turn.

The rollover decision subroutine comprises the steps of: comparing the lateral velocity predicted and applied by the filter, with a reference value of a rollover decision; and carrying out a control action for a passenger's safety when the rollover is thus predicted.

In accordance with another object of the present invention, there is provided a rollover control system, the system comprising: a vehicle operation state detecting module for detecting a steering angle, a wheel Revolutions Per Minute (RPM), a yaw rate, a roll rate, a roll angle and a vehicle speed that vary in relation to changes in the running state of the vehicle; a vehicle dynamics processing module for calculating a longitudinal velocity, lateral velocity, yaw rate, roll rate, roll angle, slip angle and slip ratio by a vehicle dynamical equation that is preset in a program after receiving the steering angle and the wheel RPM detected from a vehicle operation state detecting part; an applied filter module for predicting the slip angle and the lateral velocity by using the values calculated from the vehicle dynamics processing module and the yaw rate, roll rate, roll angle and vehicle speed detected by the vehicle operation state detecting module after a predetermined time period; a tire dynamics processing module for calculating a tire lateral force based on the slip angle value predicted at the applied filter module; a pre-rollover decision module for deterring the rollover when its generation is forecasted based on the lateral force produced from the tire dynamics processing module; a rollover decision module for performing a protective action for the passengers when the overturn is decided based on the lateral velocity generated from the applied filter module after the rollover generation control action is performed by the pre-rollover decision module.

In a preferred embodiment the applied filter module comprises a Kalman filter.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Hereinafter, the preferred embodiment of the present invention will be described in detail with reference to the accompanying drawings.

Figure 1:
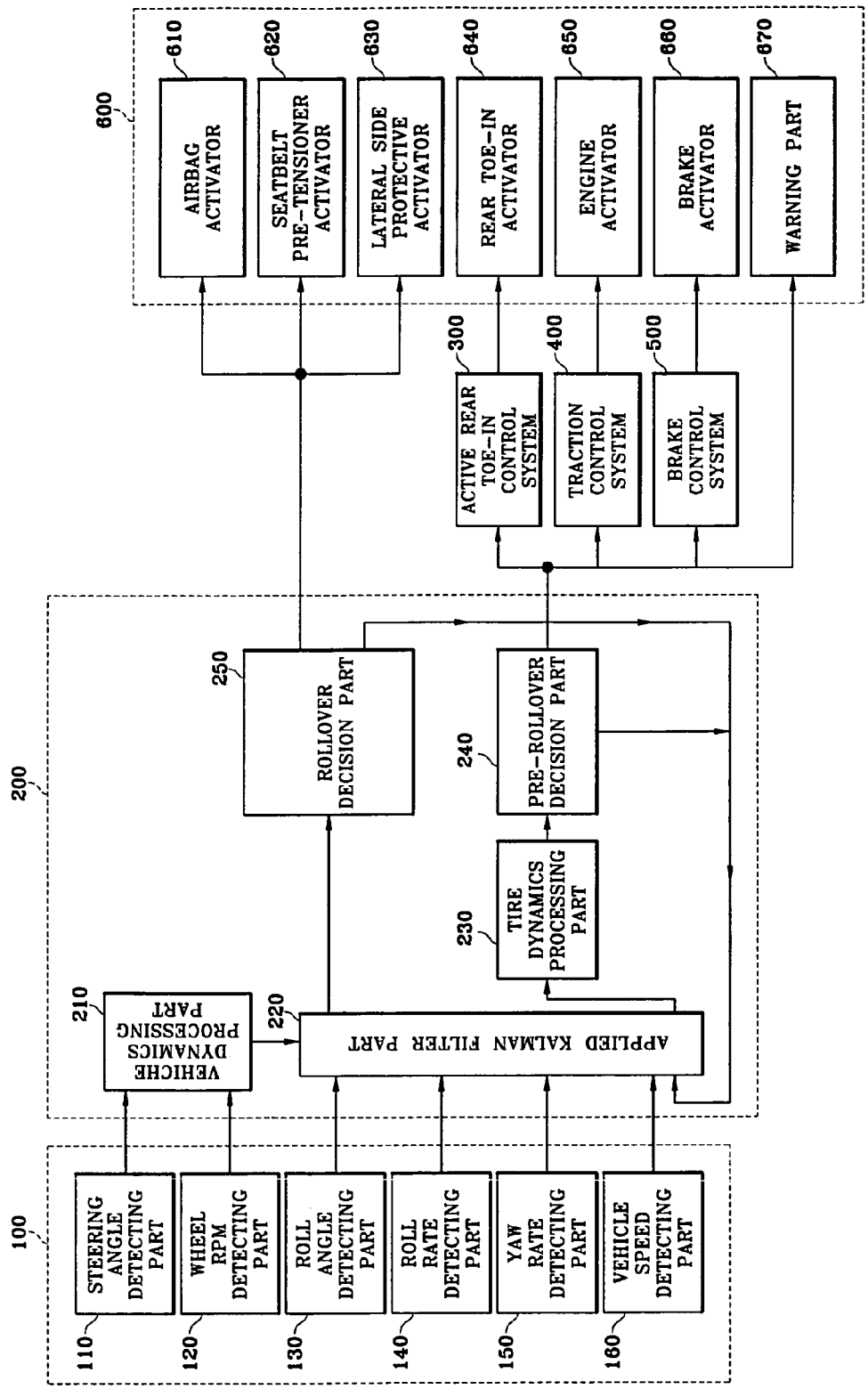
FIG. 1 is a block schematic diagram of a rollover control system according to an embodiment of the present invention.

FIG. 1 is a block schematic diagram of a rollover control system wherein a vehicle operation state detecting system 100 detects a steering angle, wheel RPM, yaw rate, roll rate, roll angle, and vehicle speed in relation to changes in the running state of a vehicle, and various modules for detecting and processing these parameters.

A rollover control system 200 comprises a vehicle dynamics processing module 210, a filter module 220, a tire dynamics processing module 230, a pre-rollover decision module 240, and a rollover decision module 250. In a preferred embodiment, the filter module 220 comprises an applied Kalman filter. The rollover control system 200 further calculates a transient slip angle by receiving the steering angle, the wheel RPM, the yaw rate, the roll rate, the roll angle and the vehicle speed detected from the vehicle operation state detecting system 100 using the filter. The rollover control system 200 then outputs a warning signal and a rollover control signal by way of performing a rollover preliminary decision, and generates a control signal for protecting the passengers once the rollover is determined.

An active rear toe-in control system 300 outputs a control signal for actively controlling the toe-in of the rear side tires according to the rollover control signal generated from the rollover control system 200. A traction control system 400 outputs a control signal for reducing an engine output in order to curtail the engine output of a vehicle according to the rollover control signal from the rollover control system 200. A brake control system 500 outputs a brake control signal for reducing the vehicle speed with respect to the rollover control signal from the rollover control system 200.

An activating system 600 includes an airbag activator 610, a seatbelt pre-tensioner activator 620, a lateral side protective activator 630, a rear toe-in activator 640, an engine activator 650, a brake activator 660, and a warning part 670, wherein control signals that are produced from the control system 200, an active rear toe-in control system 300, a traction control system 400, a brake control system 500 and the like function to prevent generation of the rollover, thereby generating the rear toe-in control, the engine output reduction, the vehicle speed slow-down and a warning signal. The activating system further causes an airbag to inflate for the passengers' safety during a rollover, adjusts a seatbelt pre-tensioner, and activates a lateral protective apparatus.

The vehicle operation state detecting system 100 contains a steering angle detecting module 110 for detecting the steering angle, a wheel RPM detecting module 120 for detecting a four-wheel RPM, a roll angle detecting module 130 for detecting the roll angle, a roll rate detecting module 140 for detecting the roll rate, a yaw rate detecting module 150 for detecting the yaw rate, and a vehicle speed detecting module 160 for detecting the speed of the vehicle.

The vehicle dynamics processing module 210 of control system 200 calculates a longitudinal velocity, a lateral velocity, a yaw rate, a roll rate, a roll angle, a slip angle, and a slip ratio using a vehicle dynamical equation that is preliminarily programmed after receiving the steering angle and the wheel RPM from the steering angle detecting module 110 and the wheel RPM detecting module 120 of the vehicle operation state detecting system 100. The filter module 220 estimates the slip angle by receiving the roll angle, the roll rate, the yaw rate and the vehicle speed detected from the roll angle detecting module 130, the roll rate detecting module 140, the yaw rate detecting module 150, and the vehicle speed detecting module 160 of the vehicle operation state detecting system 100, and by receiving the longitudinal velocity, the lateral velocity, the yaw angle, the roll rate, the roll angle, the slip angle and the slip ratio from the vehicle dynamic processing module 210. The tire dynamics processing module 230 computes and decides each tire lateral force using the predictive slip angle value at the filter module 220. The pre-rollover decision module 240 outputs a predetermined control signal for deterring the predictive rollover after assessing the lateral force from the tire dynamics processing module 230 and predicting the rollover regarding the turning of the vehicle. The rollover decision module 250 outputs an activating control signal so as to protect the passengers when the rollover is predicted, after judging the possibility of the rollover in comparison with the lateral acceleration of a vehicle produced by the filter module 220 by re-inputting the operation state of a vehicle, where the operation state varies in compliance with the control signal of the pre-rollover decision module 240.

An airbag activator 610 of activating system 600 causes an airbag to inflate according to a control signal from the rollover decision module 250 of the rollover control system 200 for the safety of the passengers when the vehicle turns over. The seatbelt pre-tensioner activator 620 adjusts the seatbelt pre-tensioner according to a control signal from the rollover decision module 250 of the rollover control system 200 for the passengers' safety during a rollover. The lateral side protective activator 630 prevents the lateral side of the vehicle from being crushed inward into the vehicle, according to a control signal from the rollover decision module 250 of the rollover control system 200. The rear toe-in activator 640, driven for the toe-in of the rear side tires of a vehicle by a control signal from active rear toe-in control system 300. Engine activator 650 reduces the engine output based on a control signal of the traction control system 400. Brake activator 660 reduces the vehicle speed via a control system of the brake control system 500. Warning part 670 warns the driver by either emitting a light signal or producing a warning sound to inform the possibility of the rollover through the warning signal of the rollover control system 200.

Figure 2:
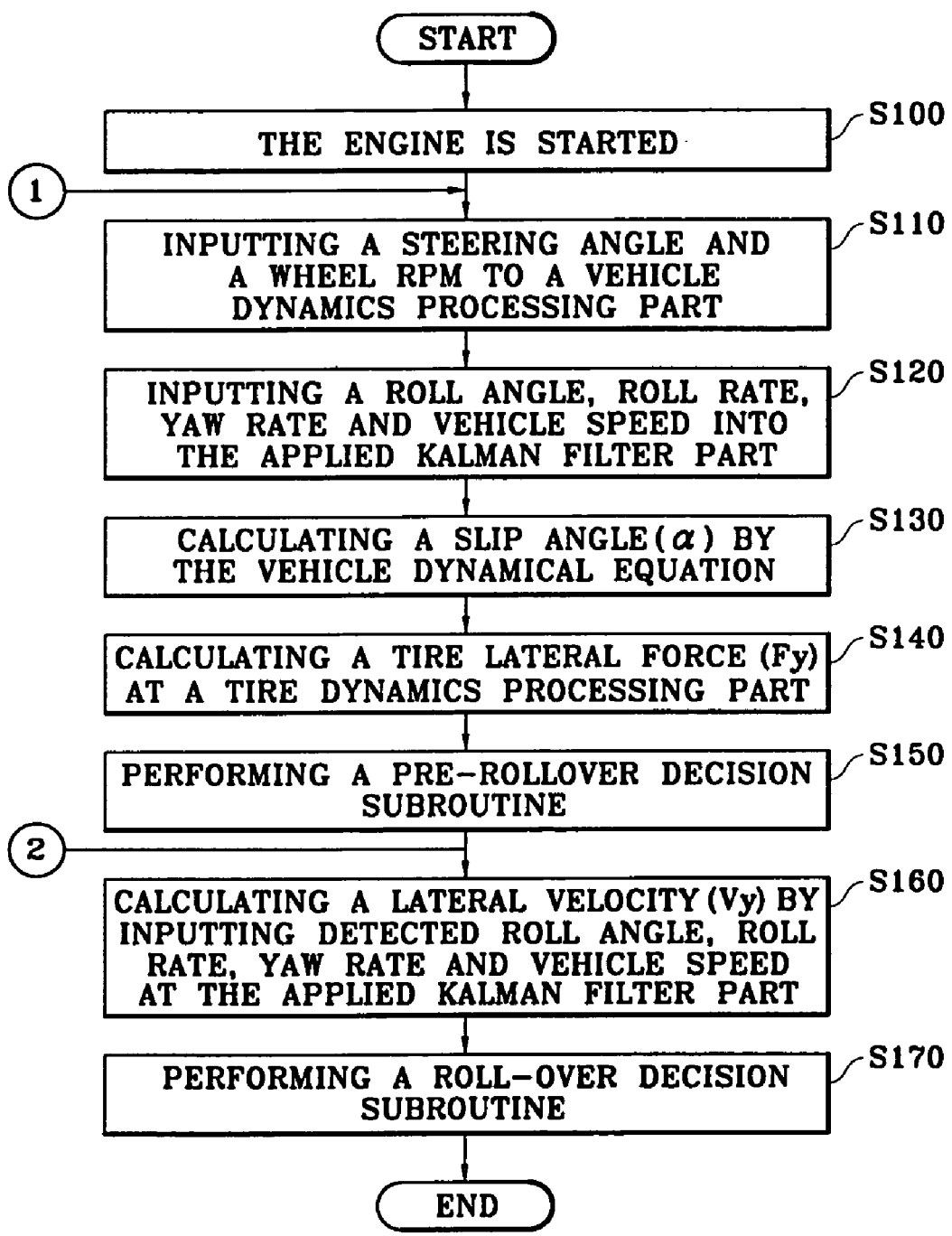
FIG. 2 is a flowchart of a rollover control method according to an embodiment of the present invention.

The rollover control system and the method thereof are described in more detail with reference to FIGS. 2 to 4.

Once the engine is started in order to move a vehicle, vehicle operation state detecting system 100 detects the steering angle, wheel RPM, roll angle, roll rate, yaw rate and the vehicle speed that vary in relation to the change of the operation state of the vehicle (S100). In addition, the rollover control system 200 receives the steering angle, the wheel RPM, the roll angle, the roll rate, the yaw rate and the vehicle speed detected from the vehicle operation state detecting system 100 to determine the possibility of the rollover.

In other words, the rollover control system 200 determining the rollover of a vehicle is so designed as to input the steering angle varied in response to a driver's steering operation and the four-wheel RPM to a vehicle dynamics processing module 210 (S110). Further, the roll angle, the roll rate, the yaw rate and the vehicle speed which all change in relation to the running state of the vehicle are inputted into an applied filter module 220 (S120).

The vehicle dynamics processing module 210 computes a longitudinal velocity, a lateral velocity, a yaw rate, a roll rate, a roll angle, a slip angle, and a slip ratio by processing the steering angle and the wheel RPM detected by a vehicle dynamical equation. The filter module 220, meanwhile, predicts and outputs the slip angle generated in a transient state by the detected yaw rate, the roll rate, the, roll angle, the vehicle speed and the values calculated by the vehicle dynamical equation preferably via a Kalman filter (S130).

Moreover, the tire dynamics processing module 230 of the rollover control system 200 receives the predicted slip angle from the filter module 220 and outputs the lateral force (Fy) of each tire using a tire dynamical equation (S140). The pre-rollover decision module 240 carries out a pre-rollover decision subroutine to decide whether a rollover has occurred by using each detected tire lateral force (Fy) (S150).

The pre-rollover decision subroutine compares each tire lateral force (Fy) that is calculated from the tire dynamics processing module 230 whereby when a rollover is predicted to occur, the pre-rollover decision subroutine sends a warning signal and control signals, such as a rear toe-in control, a vehicle speed reduction and an engine output slow-down for preventing the turnover at the same time.

The filter module 220 receives the roll angle, the roll rate, the yaw rate and the vehicle speed after the operation state of a vehicle is changed via a control signal. Such a control signal may be the rear toe-in control, the vehicle speed reduction, or the engine output slow-down, produced from the pre-rollover decision module 240 of the rollover control system 200. Filter module 220 then calculates the lateral velocity (Vy). Rollover decision module 250 is applied for accurately deciding the rollover using the lateral velocity (Vy) calculated to perform a below-mentioned rollover decision subroutine (S170).

The rollover decision subroutine receives the lateral velocity (Vy) calculated from the filter module 220 at the rollover decision module 250 and compares the lateral velocity with a reference value (CSV: Critical Sliding Velocity) for judging the rollover. When the lateral velocity (Vy) is decided to be larger than the reference value of the rollover decision, the rollover is preliminarily estimated and an airbag expansion, a lateral side protection of the vehicle, and an adjustment of the seatbelt pre-tensioner are developed in order to protect the passengers in case of a turnover.

A vehicle dynamical equation for calculating the longitudinal velocity, the lateral velocity, the yaw rate, the roll rate, the roll angle, the slip angle, and the slip ratio can be defined by the following mathematical equations 1 through 5.

Longitudinal Force, $F_x$: [Equation 1]

$$F_x = m \cdot \left[ \dot{V}_x - r \cdot V_y - r \cdot p \cdot \frac{m_s \cdot h}{m} \right]$$

Lateral Force, $F_y$:

$$F_y = m \cdot \left[ \dot{V}_y + r \cdot V_x + \dot{p} \cdot \frac{m_s \cdot h}{m} \right]$$

Yaw Moment, $T_z$:

$$T_z = I_z \cdot \dot{r} - I_{xz} \cdot \dot{p}$$

Roll Moment, $T_x$:

$$T_x = I_x \cdot \dot{p} - I_{xz} \cdot \dot{r} + m_s \cdot h \cdot [\dot{V}_y + r \cdot V_x]$$

m: total vehicle mass [kg]

[Equation 1] may be replaced by [Equation 2]

Longitudinal Velocity, $V_x$: [Equation 2]

$$\dot{V}_x = \frac{F_x}{m} + r \cdot V_y + r \cdot p \cdot \frac{m_s \cdot h}{m}$$

Lateral Velocity, $V_y$:

$$\dot{V}_y = -r \cdot V_x - \frac{1}{K_{vy}} \cdot [F_y \cdot (I_{xz}^2 - I_x \cdot I_z) + m_s \cdot h \cdot (I_z \cdot T_x + I_{xz} \cdot T_z)]$$

Yaw Rate, $r$:

$$\dot{r} = \frac{1}{K_{vy}} \cdot [(m \cdot I_x - m_s^2 \cdot h^2) \cdot T_z + m \cdot I_{xz} \cdot T_x - m_s \cdot h \cdot I_{xz} \cdot F_y]$$

Roll Rate, $p$:

$$\dot{p} = \frac{1}{K_{vy}} \cdot [m \cdot (I_z \cdot T_x + I_{xz} \cdot T_z) - m_s \cdot h \cdot I_z \cdot F_y]$$

Roll Angle, $\phi$:

$$\dot{\phi} = p$$

where, $$K_{vy} = m \cdot I_x \cdot I_z - m \cdot I_{xz}^2 - m_s^2 \cdot h^2 \cdot I_z$$

$I_x$: Roll Moment
$I_z$: Yaw Moment
$I_{xz}$: Multiplication of the Roll Moment and the Yaw Moment
$m_s$: Spring mass
h: Height between the road and the center of a vehicle Slip Angles, $\alpha$: [Equation 3]

Slip Angle of a front left wheel, $\dot{\alpha}_{fl}$:

$$\dot{\alpha}_{fl} = \frac{V_x}{\sigma_y} (\alpha_{fl\_ss} - \alpha_{fl})$$

Slip Angle of a front right wheel, $\dot{\alpha}_{fr}$:

$$\dot{\alpha}_{fr} = \frac{V_x}{\sigma_y} (\alpha_{fr\_ss} - \alpha_{fr})$$

Slip Angle of a rear left wheel, $\dot{\alpha}_{rl}$:

$$\dot{\alpha}_{rl} = \frac{V_x}{\sigma_y} (\alpha_{rl\_ss} - \alpha_{rl})$$

Slip Angle of a rear right wheel, $\dot{\alpha}_{rr}$:

$$\dot{\alpha}_{rr} = \frac{V_x}{\sigma_y} (\alpha_{rr\_ss} - \alpha_{rr})$$

Slip Ratio, $s$:

Slip Ratio of a front left wheel, $\dot{s}_{fl}$:

$$\dot{s}_{fl} = \frac{V_x}{\sigma_x} (s_{fl\_ss} - s_{fl})$$

Slip Ratio of a front right wheel, $\dot{s}_{fr}$:

$$\dot{s}_{fr} = \frac{V_x}{\sigma_x} (s_{fr\_ss} - s_{fr})$$

Slip Ratio of rear left wheel, $\dot{s}_{rl}$:

$$\dot{s}_{rl} = \frac{V_x}{\sigma_x} (s_{rl\_ss} - s_{rl})$$

Slip Ratio of a rear right wheel, $\dot{s}_{rr}$:

$$\dot{s}_{rr} = \frac{V_x}{\sigma_x} (s_{rr\_ss} - s_{rr})$$

$\sigma_x$ and $\sigma_x$: lateral and longitudinal relaxation length [m]

*The steady state value ($\alpha\_ss$) of slip angle and the steady state value ($S\_ss$) of slip ratio can be derived from [Equations 4 and 5] below.

Steady State Values of Slip Angles, $\alpha_{ss}$: [Equation 4]

Slip Angle of a front left wheel: $\alpha_{fl\_ss}$ $$\alpha_{fl\_ss} = -\delta_{fl} + \frac{V_y + l_f \cdot r}{V_x}$$

Slip Angle of a front right wheel: $\alpha_{fr\_ss}$ $$\alpha_{fr\_ss} = -\delta_{fr} + \frac{V_y + l_f \cdot r}{V_x}$$

Slip Angle of a rear left wheel: $\alpha_{rl\_ss}$ $$\alpha_{rl\_ss} = -\delta_{rl} + \frac{V_y - l_r \cdot r}{V_x}$$

Slip Angle of a rear right wheel: $\alpha_{rr\_ss}$ $$\alpha_{rr\_ss} = -\delta_{rr} + \frac{V_y - l_r \cdot r}{V_x}$$

where, $\delta_{fl} = \delta_{fo} + K_{rsf} \cdot \phi - K_{csf} \cdot F_{yfl}$ $\delta_{fr} = \delta_{fo} - K_{rsf} \cdot \phi - K_{csf} \cdot F_{yfr}$ $\delta_{rl} = K_{rsr} \cdot \phi - K_{csr} \cdot F_{yrl}$ $\delta_{rr} = -K_{rsr} \cdot \phi - K_{csr} \cdot F_{yrr}$ $\delta_{fo}$: steering angle input valve [rad]

$K_{rsf}, K_{rsr}$: roll steering coefficient of front or rear part of a vehicle [rad/rad]

$K_{csf}, K_{csr}$: cornering stiffness of front or rear part of a vehicle [rad/n]

$F_{yfl}, F_{yfr}, F_{yrl}, F_{yrr}$: lateral force of each tire [N]

Steady State values of Slip Angles, $S_{ss}$: [Equation 5]

$$S_{fl\_ss} = 1 - \frac{V_x}{R_w \cdot \omega_{fl}}$$

$$S_{fr\_ss} = 1 - \frac{V_x}{R_w \cdot \omega_{fr}}$$

$$S_{rl\_ss} = 1 - \frac{V_x}{R_w \cdot \omega_{rl}}$$

$$S_{rr\_ss} = 1 - \frac{V_x}{R_w \cdot \omega_{rr}}$$

$R_w$: dynamic rolling radius [m], (=0.32)

$\omega_{fl}, \omega_{fr}, \omega_{rl}, \omega_{rr}$: wheel angular velocity inputs [rad/s]

In addition, tire dynamical equation enumerating the lateral force of each tire can be defined by [Equations 6 to 8]

Longitudinal Force: $F_x$ [Equation 6]

$F_x = F_{xf} + F_{xr}$

Lateral Force: $F_y$ $F_y = F_{yf} + F_{yr}$

Yaw Moment: $T_z$ $$T_z = l_f F_{yf} - l_r F_{yr} + \frac{t_f}{2}[F_{xfl} - F_{yfl}\delta_{fl} - (F_{xfr} - F_{yfr}\delta_{fr})] + \frac{t_r}{2}[F_{xrl} - F_{yrl}\delta_{rl} - (F_{xrr} - F_{yrr}\delta_{rr})]$$

Roll Moment: $T_x$ $T_x = m_s \cdot h \cdot g - (K_r \cdot \phi + B_r \cdot p)$ $t_f$ and $t_r$: front and rear tread [m], (=1.4986/1.5037)

g: gravitational acceleration (=9.81)

$K_r$: sum of front and rear roll stiffness [N×m/rad]

$B_r$: sum of front and rear roll damping [N×m×s/rad]

$F_{xf}, F_{xr}, F_{yf}, F_{yr}$ in the [Equation 6] are derived from [Equation 7]

[Equation 7]

$F_{xf} = F_{xfl} + F_{xfr} - F_{yfl}\delta_{fl} - F_{yfr}\cdot\delta_{fr}$ $F_{xr} = F_{xrl} + F_{xrr} - F_{yrl}\delta_{rl} - F_{yrr}\cdot\delta_{rr}$ $F_{yf} = F_{yfl} + F_{yfr} + F_{xfl}\delta_{fl} + F_{xfr}\cdot\delta_{fr}$ $F_{yr} = F_{yrl} + F_{yrr} + F_{xrl}\delta_{rl} + F_{xrr}\cdot\delta_{rr}$ Longitudinal Force of each tire ($F_{xfl}$, $F_{xfr}$, $F_{xrl}$, $F_{xrr}$) of [Equation 7] and lateral force of each tire ($F_{yfl}$, $F_{yfr}$, $F_{yrl}$, $F_{yrr}$) can be derived from [Equation 8]

[Equation 8]

Longitudinal Force of each tire: $F_x$ $F_{xfl} = C_{xf} \cdot S_{fl}$ $F_{xfr} = C_{xf} \cdot S_{fr}$ $F_{xrl} = C_{xr} \cdot S_{rl}$ $F_{xrr} = C_{xr} \cdot S_{rr}$ Lateral Force of each tire: $F_y$ $F_{yfl} = -C_{yf} \cdot \alpha_{fl}$ $F_{yfr} = -C_{yf} \cdot \alpha_{fr}$ $F_{yrl} = -C_{yr} \cdot \alpha_{rl}$ $F_{yrr} = -C_{yr} \cdot \alpha_{rr}$ where, $C_{xf}$ and $C_{xr}$: front and rear longitudinal force stiffness [N] $C_{yf}$ and $C_{yr}$: front and rear cornering stiffness [N/rad]

Figure 3:
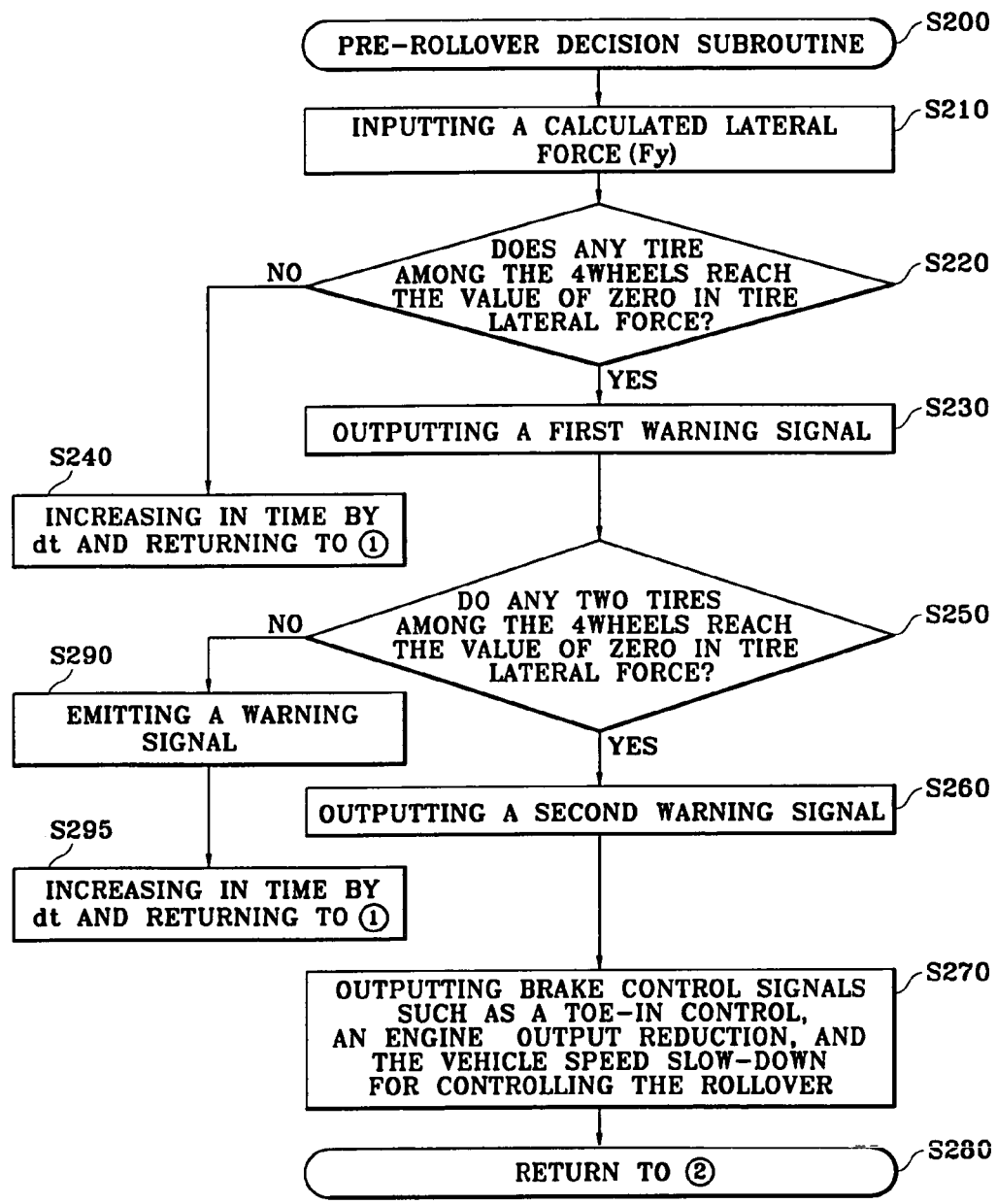
FIG. 3 is a flowchart of a pre-rollover decision subroutine in accordance with an embodiment of the present invention.

As illustrated in FIG. 3, when the pre-rollover decision subroutine starts, a pre-rollover decision module 240 receives the lateral force (Fy) of each tire from a tire dynamics processing module 230 to determine whether any of the tire lateral forces (Fy) becomes zero (S200, S210, S220). In other words, each tire having a zero tire lateral force means that any one of either front or rear outer tire of a turning vehicle is lifted from the road surface, thereby not producing any lateral force (Fy).

Subsequently, when one of the tires is decided to have a zero lateral force (Fy), the pre-rollover decision module 240 outputs a first warning signal to a driver to notify the potential rollover (S230). However, when none of the tires is judged to be zero in lateral force (Fy), the pre-rollover decision module 240 increases in time by dt and performs the step (S110) that inputs the operation state of a vehicle by returning to the main routine (S240).

Furthermore, the pre-rollover decision module 240 determines whether any of the two tires has a zero lateral force (Fy) following the first warning signal (S250). When it is determined that two of the turning tires have a zero lateral force (Fy), the pre-rollover decision module 240 outputs a second warning signal to alarm a possible rollover (S260).

Moreover, the pre-rollover decision module 240 outputs signals requesting for a rear toe-in control, an engine output slow-down, and a vehicle speed reduction to an active rear toe-in control system 300, a traction control system 400, and a brake control system 500, as shown in FIG. 1, for preventing a rollover when a vehicle makes a turn on a curved road (S270).

The active rear toe-in control system 300 outputs a toe-in control signal for an inwardly angled adjustment of the rear wheel of a vehicle to a rear toe-in activator 640 of an activating system 600.

The traction control system 400 outputs control signals for a throttle valve opening and a fuel injection to an engine activator 650 of the activating system 600 for reducing the engine output.

The brake control system 500 outputs a brake operation control signal reducing the vehicle speed during a turn on a curved road, to a brake activator 660 of the activating system 600.

The activating system 600 reduces the vehicle speed of a turning vehicle and the engine output, and makes the rear tires toe-in at the same time in response to the control signal accompanied by the active toe-in control system 300, a traction control system 400 and a brake control system 500, thereby minimizing the rollover of the vehicle.

The pre-rollover decision module 240 induces the rollover preventive control signal and inputs a roll angle, a roll rate, a yaw rate and the change of a vehicle speed into the applied filter module 220 by returning to the main routine, executing a step (S160) for calculating the lateral velocity and determining whether the rollover is completely controlled in the turning vehicle (S280).

Nevertheless, when one of the running vehicle tires is determined to maintain a zero tire lateral force, the pre-rollover decision module 240 signals a warning light to notify the driver that the vehicle is in danger of overturning and extends the time for a predetermined period (dt), and performs a step (S110) for receiving the change of the operation state of the vehicle so as to assess the rollover with respect to the operation state thereof by returning to the main routine (S290, S295).

[Rollover Decision Subroutine]

Figure 4:
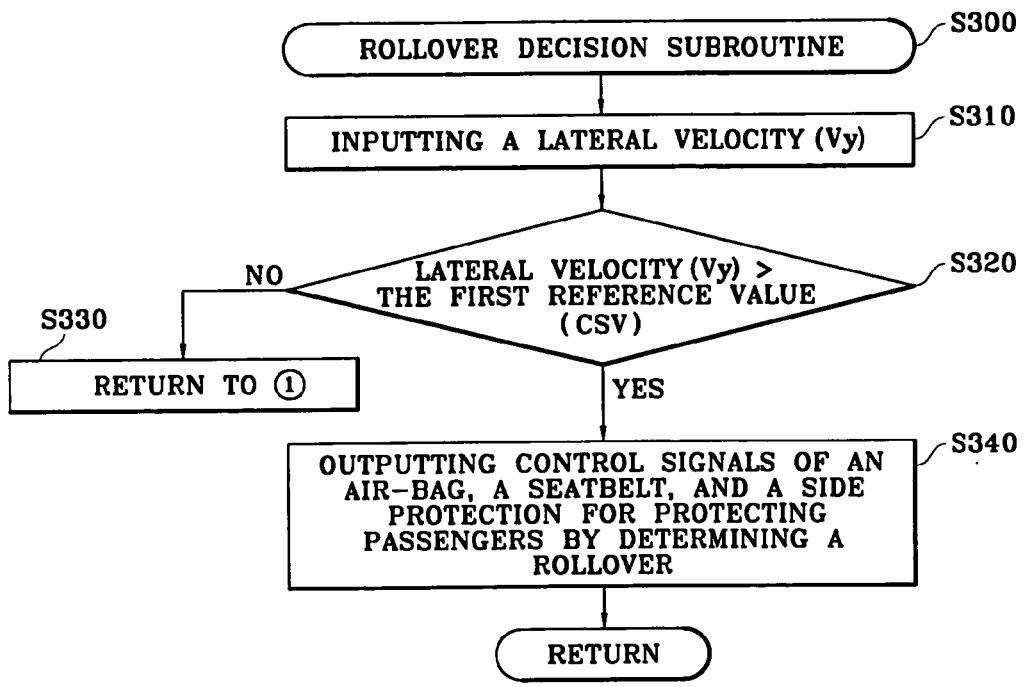
FIG. 4 is a flowchart of a rollover decision subroutine in accordance with an embodiment of the present invention.

As illustrated in FIG. 4, once the rollover decision subroutine (S300) is started, a rollover decision module 250 of a rollover control system 200 receives the input of the lateral velocity (Vy) of a turning automobile generated by a calculation at the filter module 220 and compares the lateral velocity (Vy) thereof with the first reference value for deciding generation of the rollover (S310, S320).

The first reference value (CSV) is decided by maintaining an Angular Momentum and can be defined as the following mathematical equation 9.

$$CSV = \text{Factor} \cdot \sqrt{\left[h^2 + \left(\frac{t}{2}\right)^2\right]^{1/2} - h} \qquad \text{[Equation 9]}$$

Factor: tuning value in relation to type of vehicle
t: tread
h: height of the central axis of a vehicle from the ground Once the lateral velocity (Vy) of a turning vehicle is decided to be larger than that of the first reference value, the rollover decision module 250 predicts that the turning automobile is about to be overturned, starting to output control signals for a protection of the passengers by way of an airbag expansion, a seatbelt pre-tensioner adjustment and a protection of the lateral side of a vehicle from being distorted (S340).

An airbag activator 610 of an activating system 600 ignites an airbag ignition circuit to expand the airbag according to a control signal from thee rollover decision module 250 of the rollover control system 200. A seatbelt pre-tensioner activator 620 adjusts the seatbelt for minimizing the movement of the passengers. A lateral side protective activator 630 prevents a dent in the lateral side of a car caused by a collision.

Thus, while a vehicle turns on a curved road, the filter module 220 precisely estimates the slip angle thereof by inputting the change of the running state of a vehicle, whereby the rollover can be prevented on the turning vehicle. Even in a case where a vehicle is overturned, injury to the passengers can be minimized by predicting the rollover before the overturn actually happens.

As apparent from the foregoing, there is an advantage in the rollover control method and a system thereof in that the running state of a vehicle is detected and the lateral force of each tire is predicted in real time, preferably using a Kalman filter, thereby accurately determining whether a transient rollover will occur, and contributing to prevent the rollover, so that the passengers can be protected by activating a safety system.

What is claimed is:

1. A rollover control method, the method comprising the steps of:
    detecting a steering angle, a wheel Revolutions Per Minute (RPM), a roll angle, a roll rate, a yaw rate and a vehicle speed detected according to the change of the operation state of a vehicle;
    processing said steering angle and said wheel RPM thus detected by a vehicle dynamical equation, thereby calculating a longitudinal velocity, a lateral velocity, a yaw rate, a roll rate, a roll angle, a slip angle, and a slip ratio;
    predicting a slip angle transiently generated while said yaw rate, said roll rate, said roll angle, and said vehicle speed thus detected and the values calculated using said vehicle dynamical equation are processed by a filter;
    calculating a tire lateral force based on said slip angle thus predicted;
    performing a pre-rollover decision subroutine that estimates the possibility of generating a rollover based on said tire lateral force thus computed;
    predicting a lateral velocity using the filter when there is a possibility of a generation of a rollover at said pre-rollover decision subroutine; and performing a rollover decision subroutine that assesses the rollover based on said lateral velocity thus predicted.

2. The rollover control method as defined in claim 1, wherein said filter is a Kalman filter.

3. The rollover control method as defined in claim 1, wherein the vehicle dynamical equation for calculating said longitudinal velocity, said lateral velocity, said yaw rate, said roll rate, said roll angle, said slip angle, and said slip ratio can be defined by the following mathematical equations:

Longitudinal Velocity, $V_x$:

$$\dot{V}_x = \frac{F_x}{m} + r \cdot V_y + r \cdot p \cdot \frac{m_s \cdot h}{m}$$

Lateral Velocity, $V_y$:

$$\dot{V}_y = -r \cdot V_x - \frac{1}{K_{vy}} \cdot [F_y \cdot (I_{xz}^2 - I_x \cdot I_z) + m_s \cdot h \cdot (I_z \cdot T_x + I_{xz} \cdot T_z)]$$

Yaw Rate, r:

$$\dot{r} = \frac{1}{K_{vy}} \cdot [(m \cdot I_x - m_s^2 \cdot h^2) \cdot T_z + m \cdot I_{xz} \cdot T_x - m_s \cdot h \cdot I_{xz} \cdot F_y]$$

Roll Rate, p:

$$\dot{p} = \frac{1}{K_{vy}} \cdot [m \cdot (I_z \cdot T_x + I_{xz} \cdot T_z) - m_s \cdot h \cdot I_z \cdot F_y]$$

Roll Angle, $\phi$:

$\dot{\phi} = p$ wherein $K_{vy} = m \cdot I_x \cdot I_z - m \cdot I_{xz}^2 - m_s^2 \cdot h^2 \cdot I_z$ and $I_x$=Roll Moment
$I_z$=Yaw Moment
$I_{xz}$=Multiplication of the Roll Moment and the Yaw Moment
$m_s$=Spring mass
h =Height between the road and the center of a vehicle and, Slip Angles, $\alpha$:$\alpha$
Slip Angle of a front left wheel, $\dot{\alpha}_{fl}$:

$$\dot{\alpha}_{fl} = \frac{V_x}{\sigma_y}(\alpha_{fl\_ss} - \alpha_{fl})$$

Slip Angle of a front right wheel, $\dot{\alpha}_{fr}$:

$$\dot{\alpha}_{fr} = \frac{V_x}{\sigma_y}(\alpha_{fr\_ss} - \alpha_{fr})$$

Slip Angle of a rear left wheel, $\dot{\alpha}_{rl}$:

$$\dot{\alpha}_{rl} = \frac{V_x}{\sigma_y}(\alpha_{rl\_ss} - \alpha_{rl})$$

Slip Angle of a rear right wheel, $\dot{\alpha}_{rr}$:

$$\dot{\alpha}_{rr} = \frac{V_x}{\sigma_y}(\alpha_{rr\_ss} - \alpha_{rr})$$

Slip Ratio, s:
Slip Ratio of a front left wheel, $\dot{S}_{fl}$:

$$\dot{s}_{fl} = \frac{V_x}{\sigma_x}(s_{fl\_ss} - s_{fl})$$

Slip Ratio of a front right wheel, $\dot{S}_{fr}$:

$$\dot{s}_{fr} = \frac{V_x}{\sigma_x}(s_{fr\_ss} - s_{fr})$$

Slip Ratio of a rear left wheel, $\dot{S}_{rl}$:

$$\dot{s}_{rl} = \frac{V_x}{\sigma_x}(s_{rl\_ss} - s_{rl})$$

Slip Ratio of a rear right wheel, $\dot{S}_{rr}$:

$$\dot{s}_{rr} = \frac{V_x}{\sigma_x}(s_{rr\_ss} - s_{rr})$$

wherein
$\sigma_x$ and $\sigma_x$ are lateral and longitudinal relaxation length [m].

4. The rollover control method as defined in claim 1, wherein said pre-rollover decision subroutine comprises the steps of:
determining whether a vehicle is turning based on said tire lateral force;
determining whether a vehicle is sharply turning after a first warning when the vehicle is determined to turn as mentioned in the above step; and
performing a control action in order to prevent the rollover after a second warning when the vehicle makes a sharp turn as mentioned in the above step.

5. The rollover control method as defined in claim 3, wherein the turning decision of a vehicle is made by a lifting phenomenon of the tire in which the first warning is given when one of the tires is decided to be lifted and the second warning is issued when two of the tires are judged to be lifted.

6. The rollover control method as defined in claim 3, wherein said control action to prevent the generation of the rollover comprises a toe-in control for the rear side tires, an engine output reducing control, and a vehicle speed reducing control.

7. The rollover control method as defined in claim 1, wherein said rollover decision subroutine comprises the steps of:

comparing said lateral velocity predicted and applied by the filter, with a reference value of the rollover decision; and carrying out a control operation for passenger protection when the rollover is predicted in the above step.

8. The rollover control method as defined in claim 6, wherein the control operation for protecting the passengers comprises an airbag activation, a seatbelt pre-tensioner activation and a lateral side protection activation.

9. A rollover control system comprising:

a vehicle operation state detecting module for detecting a steering angle, a wheel Revolutions Per Minute (RPM), a yaw rate, a roll rate, a roll angle and a vehicle speed angle that vary in relation to changes in the running state of the vehicle;

a vehicle dynamics processing module for calculating a longitudinal velocity, a lateral velocity, a yaw rate, a roll rate, said roll angle, a slip angle and a slip ratio by a vehicle dynamical equation preset in a program after receiving said steering angle and said wheel RPM detected from said vehicle operation state detecting module;

a filter module for predicting a slip angle and a lateral velocity after a predetermined time by using the values calculated from said vehicle dynamics processing module and said yaw rate, said roll rate, said roll angle and said vehicle speed detected by said vehicle operation state detecting part;

a tire dynamics processing module for calculating a tire lateral force based on said slip angle value predicted at said applied filter module;

a pre-rollover decision module for deterring the rollover when its generation is predicted based on said lateral force produced from said tire dynamics processing module; and a rollover decision module for performing a protective action for the passengers when the overturn is decided, based on said lateral velocity generated from said filter module after the rollover generation control action is performed by said pre-rollover decision module.

* * * * *